INVENTOR.
Freddy Homburger
BY
Roberts, Cushman & Grover
ATT'YS

United States Patent Office 3,130,099
Patented Apr. 21, 1964

3,130,099
METHOD FOR MOUNTING BIOLOGICAL SECTIONS, TRANSPARENCIES AND THE LIKE
Freddy Homburger, 759 High St., Dedham, Mass.
Filed Sept. 30, 1960, Ser. No. 59,734
1 Claim. (Cl. 156—57)

This invention relates to optically transparent mounts and a method of making the same.

Heretofore biological sections, pictorial representations of gross specimens and other pertinent material, such as photomicrographs, X-rays, fluorescent photomicrographs, electron-micrographs and the like, have been mounted for reference, analysis, comparison and the like, between glass slides, sealed about their edges by means of tape, or disposed in frames, to hold the exhibits in place and to provide support for microscope study, or by projection on a screen. Such mounts are heavy, bulky, fragile, do not hermetically isolate the exhibit from the atmosphere, so that they ultimately deteriorate, are not optically satisfactory in many instances and are difficult to make.

The objects of this invention are to make mounts for exhibits of the foregoing kind which are of light weight, more comparable in thickness to the exhibit itself, flexible, resistant to the penetration of air or moisture and hence to deterioration of the specimen and optically satisfactory for examination by reflected or transmitted light, such as lantern projection and/or microscopy.

The invention will now be described in greater detail with reference to the accompanying drawings wherein.

In accordance with this invention, and in contrast to the conventional glass slide mount heretofore used, the mount comprises a non-lamina, completely integrated, transparent plastic structure, within which the section is hermetically sealed; which is light in weight, non-fragile, non-flammable, resistant to penetration by moisture and air, and optically satisfactory for examination by reflected or transmitted light.

Figure 1:
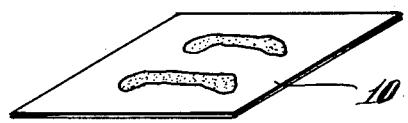
FIG. 1 is a perspective view of a conventional paraffin microtome section of a biological specimen.
Figure 2:
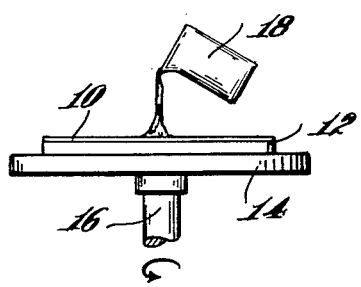
FIG. 2 is an elevation showing the first step of casting the microtome section in a transparent film.

The mount is made by first casting a microtome section in a film of transparent plastic and, to this end, a section 10 (FIG. 1), is placed on a plate of glass 12 which, in turn, is mounted on a table 14 supported by a shaft 16, by means of which the table can be rotated at any desired speed. A solvent solution of plastic material is then poured from a container 18 into the section, as shown in FIG. 2, while the table is being rotated, so that the centrifugal force developed by the rotating table disperses the solvent solution of plastic uniformly and rapidly throughout the section.

The solvent solution of plastic used herein is a mixture of 2 cubic centimeters of dibutyl phthalate, 75 cubic centimeters of xylene solvent and 21 grams of polystyrene. The mixture is agitated for about 24 hours by rotating in a container and provides a non-flammable polystyrene film of very uniform, optically transparent character when the solvent is evaporated.

Figure 5:
FIG. 5 is a fragmentary section through a completed mount on an exaggerated scale, showing integration of the section with the plastic sheets.
Figure 3:
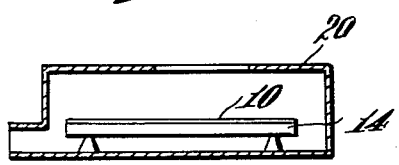
FIG. 3 is a vertical section through an evaporator, showing the second step of removing the solvent from the cast film.
Figure 6:
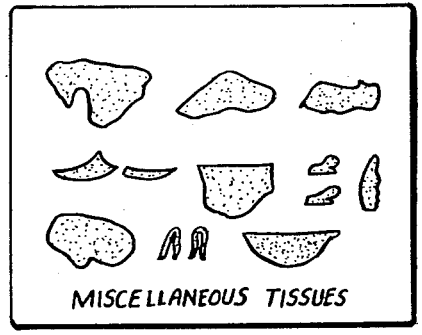
FIG. 6 is a plan view of a mount, such as made in accordance with the method herein disclosed, showing several exhibits and a legend.
Figure 4:
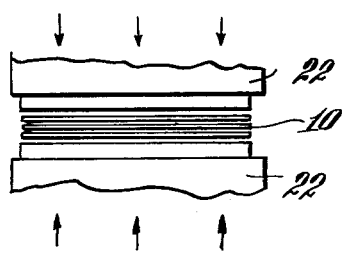
FIG. 4 is an elevation showing the third step of applying pressure and heat to incorporate the cast film between sheets of transparent plastic.

Having saturated the microtome section with the solvent mixture referred to, the glass plate 12 is removed from the table 14 and placed in an evaporator chamber 20 where evaporation is accelerated by connecting the chamber, at one side, to a vacuum pump or the like. After evaporation of the solvent the film 10 will set within about 24 hours at room temperature. The glass plate, with the film resting on it, is then placed in a receptacle of water so as to float the film off. The film, having been removed from the plate 14 and dried, is then placed between two sheets of a transparent plastic which is compatible with the polystyrene, for example, polyethylene, whereupon the several laminae are placed between relatively movable pressure-applying platens 22 (FIG. 4), which may be brought together to squeeze the film between the sheets to exclude the air and heated to cause fusion and integration of the film and sheets, so that the composite structure (FIG. 5) is monolithic, that is, non-lamina, substantially optically homogeneous and hermetic.

The section is cast in a polystyrene film because of its non-flammable character and because it integrates with the covering sheets of polyethylene without the evolution of volatiles and hence without danger of including bubbles or voids in the completed section which would interfere with optical examination.

The cast film has a thickness of about 0.008 millimeter and when incorporated between the plastic sheets the entire thickness is in the order of 0.5 millimeter and weighs 6.1 grams as compared to the thickness and weight of a glass mount which is approximately ⅛ of an inch (3.175 millimeters) thick and weighs about 54 grams.

The mounts may be made up with a single section or, as shown in FIG. 2, a plurality of sections and appropriate legends for identifying the sections incorporated therein. The legends may be incorporated by printing or typing on a transparent ribbon of polystyrene and included with the sections between the plastic sheets of polyethylene prior to integration so as to be a permanent part of the mount.

The slide is described above as being made up of a microtome section, however, other exhibits may be similarly mounted, for example film transparencies, in black and white or color, provided the latter are comprised of a plastic which is compatible with the polyethylene sheets, is non-flammable and fuses without the evolution of volatiles. The film transparency is incorporated between the polyethylene plastic sheets, pressure is applied to exclude the air and heat supplied to integrate the several sheets, so that a non-lamina, homogeneous structure results containing no interfaces or bubbles which would interfere with the optical reflection or transmission of light during microscopic examination or photographic projection. Such film transparencies may take the form of pictorial representations or gross specimens, microphotographs, X-rays, photomicrographs, fluorescence micrographs, electronmicrographs and the like.

It should be understood that the present disclosure is for the purpose of illustration only and that this invention includes all modifications and equivalents which fall within the scope of the appended claim.

I claim:

The method which comprises providing a support rotatable about a vertical axis, placing a specimen on a flat glass plate and mounting the plate on the rotatable support, rotating the support to effect rotation of the plate and hence of the specimen about an axis perpendicular to the surface of the specimen, while rotating the support pouring a fluid solution of polystyrene onto the exposed surface of the specimen to effect uniform distribution of the fluid solution throughout the specimen, removing the plate with the impregnated specimen from the rotating support and placing it in an evaporator, evaporating the solvent from the fluid solution to form a solid polystyrene film, removing the plate from the evaporator and placing it in a water bath to separate the film from the plate by flotation, drying the separated film, placing it between sheets of polyethylene and concomitantly pressing the film between said sheets and subjecting them to heating to effect fusion of the sheets to each other and to the film.

References Cited in the file of this patent

UNITED STATES PATENTS

| | | |
|---|---|---|
| 1,981,453 | Hyde | Nov. 20, 1934 |
| 2,105,688 | Fessenden | Jan. 18, 1938 |
| 2,158,981 | Collins et al. | May 16, 1939 |
| 2,419,756 | Arnold | Apr. 29, 1947 |
| 2,567,929 | Fessenden | Sept. 18, 1951 |
| 2,712,514 | English | July 5, 1955 |
| 2,871,152 | Tobin | Jan. 27, 1959 |